United States Patent [19]

Hudgin

[11] 4,300,306
[45] Nov. 17, 1981

[54] ELECTRICAL SCREEN

[76] Inventor: Richard H. Hudgin, 56 Framingham Rd., Marlboro, Mass. 02173

[21] Appl. No.: 101,268

[22] Filed: Dec. 7, 1979

[51] Int. Cl.³ .............................................. A01M 1/22
[52] U.S. Cl. ................................ 43/112; 174/117 M; 256/10
[58] Field of Search ........................... 43/98, 107, 112; 256/10; 49/59; 109/35; 174/117 FF, 117 M, 129 R

[56] References Cited

U.S. PATENT DOCUMENTS

| | | | |
|---|---|---|---|
| 794,573 | 7/1905 | Word | 43/98 |
| 1,059,253 | 4/1913 | Wimbish | 43/112 |
| 1,648,723 | 11/1927 | Coglon | 43/112 |
| 2,165,560 | 7/1939 | Luther | 43/112 |
| 2,278,538 | 4/1942 | Dubilier | 43/112 |
| 4,144,668 | 3/1979 | Darncharnjitt | 43/112 X |

FOREIGN PATENT DOCUMENTS 2650385 5/1978 Fed. Rep. of Germany ........ 43/112

Primary Examiner—Stephen G. Kunin
Assistant Examiner—Robert P. Olszewski
Attorney, Agent, or Firm—Cushman, Darby & Cushman

[57] ABSTRACT

Apparatus for killing pests with an electrified screen. The screen has conductive weft strands woven between insulative warp strands. Insulative weft strands may be disposed between adjacent conductive weft strands. Busses are disposed in the warp having an insulative base and conductive strips on opposite sides thereof. Alternate conductive weft strands contact one of the strips and the remaining conductive weft strands contact the other strip. The screen may be mounted vertically about a field to kill insects attempting to enter. Also the screen may be employed around the home to kill pests.

6 Claims, 5 Drawing Figures

U.S. Patent  Nov. 17, 1981  4,300,306
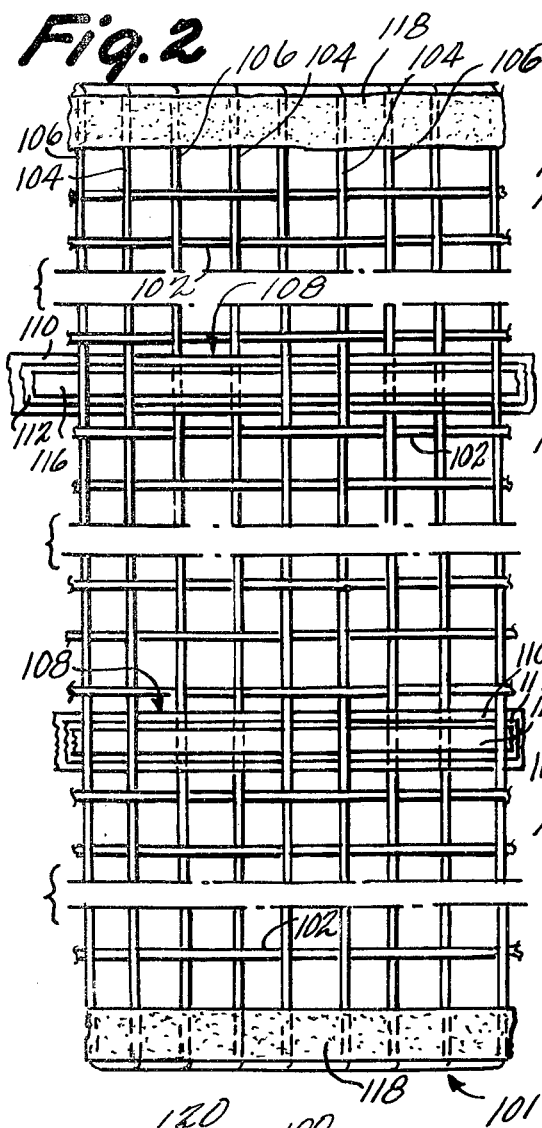
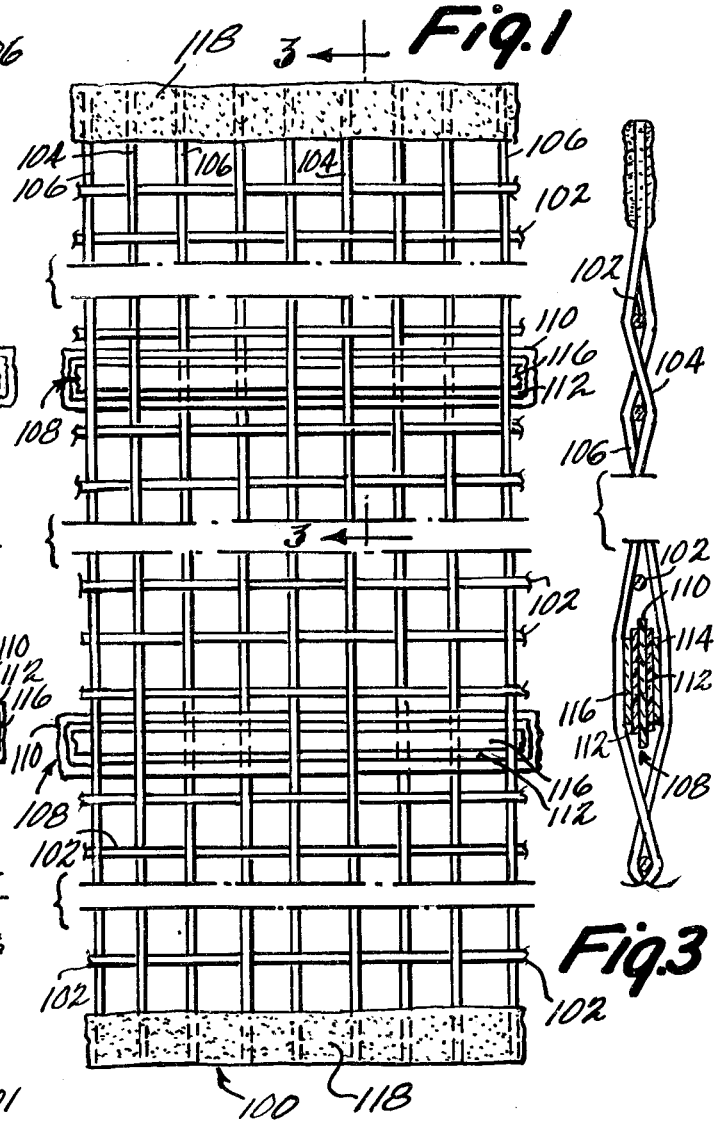
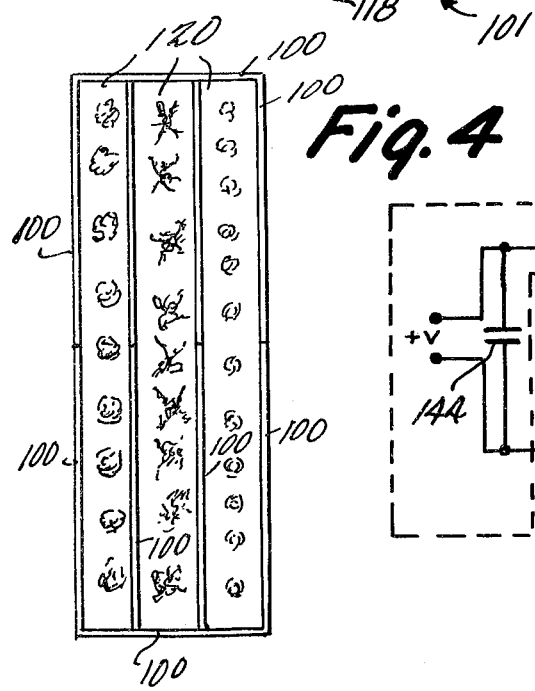
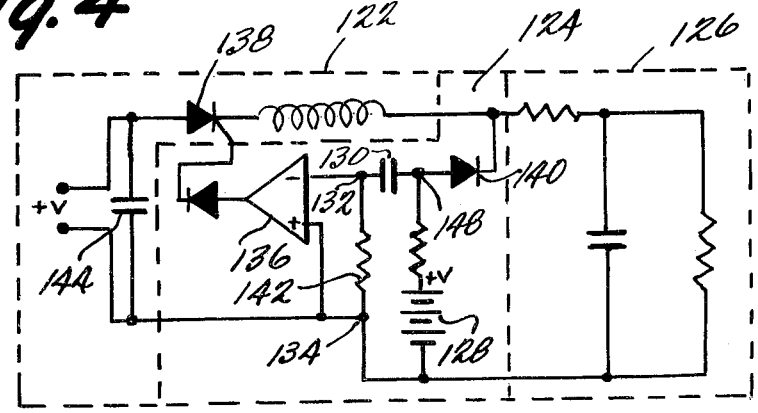

ELECTRICAL SCREEN

BACKGROUND AND SUMMARY OF THE INVENTION

This invention relates to the killing of unwanted insects and small animals, and more particularly to the use of an electric screen to accomplish this end.

Heretofore, chemicals have generally been used to eliminate insect and animal pests. While such chemical pesticides have been effective in killing pests, several deleterious side effects accompany their use. In outdoor fields such pesticides leave a chemical residue on plant life within the field. This chemical residue may be ingested when the plants are consumed, thereby affecting the health of animals higher in the food chain. In addition, most chemical pesticides must be reapplied at least once a year in order to assure the continued elimination of pests.

Pesticides spread in homes and other structures create a constant danger of poisoning to inhabitants. Even flea collars must be employed cautiously. At least several flea collars currently on the market utilize a nerve gas which has been known to affect people near the pet.

Furthermore insects are becoming more and more resistant to insecticides. Clearly, a nonchemical approach would add an important weapon in the arsenal of farmers and the like in the continuous war waged against pests.

The use of electrical screens to kill small animal life has been proposed in the prior art. U.S. Pat. No. 794,573 teaches an electrified screen apparatus for catching fish. The patent discloses a screen designed specifically for use in water and does not suggest a method of adapting it for use on dry land. Nor does the patent suggest a means of eliminating aquatic life from a large underwater area, because the only function of the apparatus is to catch fish.

U.S. Pat. Nos. 1,059,253, 2,278,538, and 3,077,050 disclose various electrical screens capable of destroying insect life. These devices have been designed to be mounted in a window or other opening to completely enclose an area. None of these patents suggest a method of eliminating insect life from a large open area such as an agricultural field.

Furthermore, these screens are not durable. Damage to even a small portion of the electrical screen devices mentioned above, particularly along one of their conductive edges, will eliminate electric power to the rest of the screen.

The present invention overcomes these problems in providing a durable electric screen for killing insects and small bugs. In the present invention, a set of weft strands, composed of alternating conductive strands and non-conductive strands are woven through a set of parallel warp strands, composed of electrically insulative material. To power the screen, some of the warp strands are replaced by busses, composed of non-conductive bases having separated conductive strips attached on opposite sides thereof. The pattern of the weaving is such that alternate conductive weft strands pass on opposite sides of the busses and contact the conductive strips on that side. Thus, when a voltage is applied across the conductive strips of each bus, the voltage appears across adjacent conductive weft strands.

The use of non-conductive weft strands between adjacent conductive warp strands adds to the durability of the present invention by eliminating the possibility of shorting which would occur if adjacent conducting warp strands were to touch. The use of a plurality of busses also adds to the durability of the present invention by allowing a large portion of the screen to be damaged or destroyed without affecting the electrical voltage in the remainder of the screen.

A screen as described above has many applications. It can be erected vertically around a field to kill entering insects.

If the spaces between conductors is made small, the screen could be used as a flea mat. The high voltage screen may be laid under a loosely woven mat of insulating material. Placed in the living or sleeping area of a pet, the high voltage mat would kill any fleas or other insects contacting it, and yet the loosely woven mat would protect the pet from injury.

A coarsely woven screen could be laid on the ground, on the deck of a ship, or around some object to be protected to kill animals having a size comparable to the grid dimension. An insulating layer under the screen may be employed to avoid any shorting on the surface beneath.

The screen of the present invention could also be used to remove pests from a field. Thus, a screen could be dragged behind a tractor over a field in order to stir up any insects and destroy them.

A relatively fine grid screen could be made in the form of a tape which may be laid on the floor in areas frequented by cockroaches, ants or other household insects.

When the screen is used to surround fields, or as a small animal pest killer, it is advantageous to employ an active power supply. Specifically, a small voltage is applied across the screen at all times. A sensing circuit produces a signal when the resistance of the screen is decreased, indicative of the presence of a pest. This signal triggers the application of a higher voltage across the screen which would kill the pest.

Obviously, both the power supply and the screen can be tailored to the type of pests to be killed.

Thus, the electric screen of the present invention has many advantages. Since materials for the screen are inexpensive and the method of manufacturing well known and efficient, the manufacturing cost is low. Since insulators run both directions and several busses are used, it has high durability. Furthermore, installation is easy and inexpensive and once installed, the cost of maintenance is low.

These and other objects and advantages of the invention will become more apparent and more readily appreciated from the following detailed description of the presently preferred exemplary embodiments of the invention taken in conjunction with the accompanying drawing, of which:

FIG. 1 is a front view of a first embodiment of the electric screen of the present invention in its fully constructed form;

FIG. 2 is a front view of a second embodiment of the electric screen of the present invention in an intermediate stage of construction;

FIG. 3 is a sectional view along the 3—3 line of FIG. 1;

FIG. 4 is a schematic top view of the screen of the present invention deployed about a field; and FIG. 5 is a circuit diagram of the power supply of the present invention.

DETAILED DESCRIPTION OF THE PREFERRED EMBODIMENTS

Referring to FIG. 1, woven screen 100 consists of a set of parallel warp strands 102 of electrically insulative material. The weft consists of electrically insulative strands 104 alternating with electrically conductive strands 106. The non-conductive strands may be of any durable, flexible material such as plastic. The conductive strands may be of any appropriate metal such as aluminum. Corrosion resistance is a desirable characteristic.

Replacing warp strands 102 at spaced intervals are busses 108. As illustrated in FIGS. 1, 2 and 3, busses 108 each have a non-conductive base 110 made of mylar or the like. Affixed to opposite sides of base 110 are resilient pads 112 which may be made of any elastomer such as foam. Attached to resilient member 112 are conductive strips 114 and 116 which may be of any of the materials appropriate for conductive strands 106. Conductive weft strands 106 must be woven so that every other conductive strand 106 contacts strip 116, with the remainder of conductors 106 contacting strip 114.

Any number of busses may be employed. As the number of busses increases, the effect of cuts in the screen decreases. Upon balancing the increased effectiveness with the increased cost of manufacture, it appears the ideal number of busses is from 2 to 4.

The strands of both the warp and the weft are held in position at the outer circumference of the screen by means of binding 118. In the preferred embodiment, binding 118 is a resin, specifically, epoxy.

The screen of the present invention may be formed on a conventional weaving machine. First, the warp consisting of insulators 102 and busses 108 is laid out. Then the weft consisting of conductors 106 and insulators 104 is woven into the warp.

The weft may be formed from continuous strands, as illustrated in FIG. 2. After completion of the weaving, epoxy or some other binder 118 is applied to the edges of the screen. FIG. 2 illustrates one embodiment of the present invention in this stage of construction, just after application of the epoxy. As can be seen in FIG. 2, at this stage of construction, each conductor 106 is connected at the top and the bottom to the adjacent conductor 106. To enable adjacent conductive strands 106 to have a potential applied therebetween, it is necessary to isolate the adjacent conductors 106. This is accomplished by cutting the ends off the top and bottom of the screen. FIG. 1 illustrates a screen on which this step has been performed so that in FIG. 1, adjacent conductors will not be shorted at the top and bottom.

Another difference between screen 100 in FIG. 1 and screen 101 in FIG. 2 is the pattern of insulators 104 and conductors 106 with respect to the warp. Specifically, conductors 106 and insulators 104 of screen 101 are paired and each pair passes through the warp in the same manner from one end of the screen to the other. Thus, in each pair, when conductor 106 passes over a warp strand, insulator 104 passes over a warp strand.

Adjacent weft strands 104 and 106 of screen 100 pass on opposite sides of warp strands 102, except around busses 108. Near busses 108, pairs of conductors 106 and insulators 104 must pass together over and under busses 108, so that alternate conductors 106 pass on opposite sides of each bus 108.

Either of these weave patterns can be employed to form the screen and there are advantages to both. Specifically, with the weave of screen 100, each conductor 106 cannot cross the adjacent insulators 104, let alone contact the next conductor 106, thus enhancing durability. However, the weave of screen 100 is complicated in that a different pattern must be employed near busses 108. On the other hand, the weave of screen 101 is easier to execute since the pattern is the same from top to bottom. However, each conductor 106 can pass over the adjacent insulators 104 and thus approach the next conductor 106.

As mentioned above, the screen of the present invention has many applications. It can be erected vertically around a field to kill entering insects. As illustrated in FIG. 4, a plurality of screens 100 or 101 are erected around the field, each screen having its own power supply. To further enhance effectiveness, screens are erected within the field, dividing the field into pluralities of rows. This aids in killing insects that do find their way into the field. In the preferred embodiment, the screen is 3 to 6 feet high and is positioned 3 to 6 feet above the ground. It is known that above a short region near the ground, the number of insects increases with altitude up to 9 to 18 feet. However, most of the insects in the upper region are not interested in feeding and will most likely pass over the field. Thus, by raising the screen 3 to 6 feet above the ground, most of the insects which might feed on the vegetation within the field will be killed. Raising the screen off of the ground is advantageous in avoiding shorting from animals and plants. Obviously, the crop type and the type of insect which feeds on that particular crop should be studied individually so that the height of the screen and its position above the ground can be adjusted for maximum effectiveness. Thus the screen could extend from between 0 and 7 feet above the field surface to between 6 and 20 feet above the field surface.

Moreover, it appears that different species of insects fly at different altitudes. Therefore, depending on the particular crop to be enclosed, it may be advantageous to vary the mesh size from bottom to top to handle different size bugs optimally.

Thus the screen of the present invention provides a durable insecticide that can be erected about the field. Insulators 104 between conductors 106 increase the resistance of the screen to weather and handling. Obviously, more than one insulator 104 can be employed between adjacent conductors 106. On the other hand, the simplicity of the screen can be increased by eliminating insulators 104. The use of more than one bus 108 in a screen enables the screen to be powered in spite of cuts in the screen, and even cuts in a bus. Positioning more than one independent screen area around the field enables each area to function even if other areas are damaged.

Furthermore, the screen of the present invention allows low cost, continuous fabrication. As mentioned above, well known weaving techniques may be employed to weave the screen of the present invention. This feature is particularly enhanced by the manner in which busses 108 are woven right into the warp.

It is estimated that a charge of 5 to 10 kilovolts should kill all potential insects. In order to minimize energy dissipation between insect landings, it is advantageous to employ an active power supply as illustrated in FIG. 5. The power supply includes high voltage source 122, and sensing circuit 124. Circuit 126 represents the equivalent circuit of screen 100 or 101.

Between insect landings, voltage source 128 of sensing circuit 124 supplies a small voltage across screen equivalent circuit 126. This voltage may be in the 1 to 100 volt range. In the preferred embodiment source 128 provides 10 volts across circuit 126. Furthermore, voltage source 128 charges capacitor 130. Sensing circuit 124 operates by detecting a sudden drop in circuit 126 resistance when a bug lands on the screen. Without a bug, the screen is virtually non-conductive. When a bug lands on the screen, a resistance of roughly 1 megohm has been measured. Even with a leakage current corresponding to 0.1 megohm, the 10% change in resistance over a few milliseconds would be clearly detectable. Thus, the screen can deteriorate up to a point without imparing performance.

The major concern in an active control system such as this is the RC time constant of circuit 126. The capacitance of circuit 126 with a width of 1 meter and a length of 60 meters, having a spacing of 0.3 centimeters between conductors having a radius of 0.5 millimeters is approximately $3 \times 10^{-7}$ farads. The electrical resistance of such a screen to a change in voltage is basically the resistance of the contact wire over roughly half the length of the screen. For a 1 millimeter diameter contact wire of aluminum in a 60 meter screen, the resistance is approximately 2 ohms. Thus the RC time constant to charge the screen is approximately 0.6 microseconds. This means that a bug touching any screen element can be rapidly sensed and the screen charged.

As indicated above, volt source 128 both produces a small voltage across circuit 126 and charges capacitor 130. At this time, point 132 has a voltage higher than point 134 so that comparator 136 has a low output. Therefore, SCR 138 is off. When a bug lands on the screen, the resistance of circuit 126 drops so that capacitor 130 tends to discharge through diode 140, circuit 126, and resistor 142. This makes the voltage at point 134 positive with respect to the voltage at point 132 so the output of comparator 136 becomes high, turning on SCR 138.

In the period of time before SCR 138 turns on, a low current source (lower than the hold current of SCR 138) charges capacitor 144 to a high voltage such as 5 to 10,000 volts. When SCR 138 becomes conductive, capacitor 144 is discharged through SCR 138, inductor 146, and circuit 126. Diode 140 protects sensing circuit 124 from the high voltage. After capacitor 144 discharges, SCR 138 turns off, and voltage source 128 again supplies a small voltage across circuit 126 and charges capacitor 130.

Thus, the active power supply reduces dissipation losses in the screen. Furthermore, if certain insects can sense electric fields, such insects would not attempt to avoid a screen with a field generated by only 10 volts. This particular circuit automatically compensates for short circuits in the screen, such as caused by rain or the like. Specifically, such shorting merely decreases the resistance of circuit 126. Since the voltage at point 148 will be lower, bugs cannot be sensed so that capacitor 144 will never be discharged across a short circuit.

The screen of the present invention has other applications also. For example, the screen can be woven with an extremely fine mesh and positioned beneath a loosely woven, flea-permeable, mat of insulating material in the living or sleeping area of a pet. Such a screen is useful in killing fleas. The power supply for such a mat is left on constantly and limited to 0.2 milliamps total output, thus rendering the mat safe for animals and humans.

Even total shorting (e.g. caused by melted snow, urine or chewing) would draw little power, and the mat would function again when the short was removed.

The screen of the present invention, having a small mesh can be put in the form of a tape and laid on the floor in areas frequented by cockroaches, ants or other household insects, thus providing an effective means of eliminating such pests. The tapes advantageously have cords which plug into one another and into a master power supply. A pulsed power supply is preferred in this embodiment which automatically turns on every five to ten seconds. This power supply would conserve power and also allow the insects to crawl on the strip when no high voltage can be sensed.

The screen can also be used to kill mice, rats or other small animal pests. A coarsely woven screen laid on the ground or the deck of a ship allows animals of the grid dimension to be killed. An active power supply as illustrated in FIG. 5 is advantageously used in this embodiment. An insulating layer under the screen eliminates any shorting on the surface beneath. The current level supplied to the screen is set to cause fibrillation in the pest, which level would not cause fibrillation in a person or larger pet.

The present invention could also be used as a field depester. A screen according to the present invention could be dragged behind a tractor over a field in order to stir up any insects and destroy them.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An electrical screen for killing pests comprising:
   a set of warp strands of an electrically insulating material;
   a first set of weft strands of an electrically insulating material, woven between said warp strands;
   a second set of weft strands of an electrically conducting material woven between said warp strands, each strand of said second set being separated from an adjacent strand of said second set by at least one strand of said first set; and
   means for applying an electrical potential between each strand of said second set and the adjacent strand of said second set.

2. An electrical screen for killing pests comprising:
   a set of warp strands of an electrically insulating material;
   a set of weft strands of an electrically conducting material woven between warp strands;
   at least one bus having an electrically insulating base and first and second electrically conductive strips, said base having generally planar outer surfaces, said strips being disposed on said outer surfaces on opposite sides of said base, said at least one bus being disposed parallel to said warp strands, said electrically conducting weft strands being woven about said at least one bus so that alternate ones of said electrically conducting weft strands contact the side of said first strip opposite said base and the remainder of said electrically conducting weft strands contact the side of said second strip opposite said base; and means for applying a voltage across said first and second strips.

3. Apparatus as in claim 1 or 2 further comprising means for fixing the position of the ends of each of said warp and weft strands with respect to the other warp and weft strand ends.

4. Apparatus as in claim 2 wherein said bus further comprises a first resilient member disposed between said base and said first strip and a second resilient member disposed between said base and said second strip, said resilient members biasing said strips outwardly to contact said weft strands.

5. Apparatus as in claim 1 wherein said means for applying comprises:

means for sensing a decrease in resistance between adjacent strands of said second set; and means for applying an electrical potential between said adjacent strands in response to said sensing means.

6. Apparatus as in claim 2 wherein said means for applying comprises:

means for sensing a decrease in resistance between said first and second strips; and means for applying an electrical potential between said first and second strips in response to said sensing means.

* * * * *